United States Patent
Byford et al.

(10) Patent No.: US 9,448,760 B2
(45) Date of Patent: *Sep. 20, 2016

(54) METHOD AND SYSTEM FOR IDENTIFYING DRAWING PRIMITIVES FOR SELECTIVE TRANSMISSION TO A REMOTE DISPLAY

(71) Applicant: VMware, Inc., Palo Alto, CA (US)

(72) Inventors: Dustin Byford, Pacifica, CA (US); Anthony Cannon, Cupertino, CA (US); Ramesh Dharan, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,133

(22) Filed: Dec. 2, 2014

(65) Prior Publication Data
US 2015/0301786 A1 Oct. 22, 2015

Related U.S. Application Data

(63) Continuation of application No. 12/428,949, filed on Apr. 23, 2009, now Pat. No. 8,902,242.

(51) Int. Cl.
*G06T 9/00* (2006.01)
*G06F 3/14* (2006.01)

(52) U.S. Cl.
CPC ........... *G06F 3/1462* (2013.01); *G06F 3/1415* (2013.01); *G09G 2310/04* (2013.01); *G09G 2350/00* (2013.01)

(58) Field of Classification Search
CPC ...................... G09G 2310/04; G09G 2350/00; G09G 5/399; G09G 2360/18; G09G 5/395; G06F 3/1454; G06F 3/1462; G06F 3/1415; G06F 9/4445

See application file for complete search history.

(56) References Cited

U.S. PATENT DOCUMENTS

| | | | |
|---|---|---|---|
| 6,370,574 B1 | 4/2002 | House et al. | |
| 6,380,935 B1 | 4/2002 | Heeschen et al. | |
| 7,386,324 B2 | 6/2008 | Moriyama et al. | |
| 7,899,864 B2 | 3/2011 | Margulis | |
| 2005/0256950 A1 | 11/2005 | Suzuki | |
| 2006/0012612 A1 | 1/2006 | Johnston et al. | |
| 2009/0033670 A1* | 2/2009 | Hochmuth | G06F 3/1454 345/545 |

FOREIGN PATENT DOCUMENTS

| | | |
|---|---|---|
| JP | 11-331610 | 11/1999 |
| JP | 2005228227 A1 | 8/2005 |
| JP | 2005284694 A1 | 10/2005 |

(Continued)

OTHER PUBLICATIONS

Notification of Reasons for Refusal with English Translation for Japanese Application No. 2010-094793 mailed Jan. 11, 2013.

(Continued)

*Primary Examiner* — Hau Nguyen

(57) ABSTRACT

Remote desktop servers include a display encoder that maintains a secondary framebuffer that contains display data to be encoded and transmitted to a remote client display and a list of display primitives effectuating updated display data in the secondary framebuffer. The display encoder submits requests to receive the list of drawing primitives to a video adapter driver that receives and tracks drawing primitives that, when executed, update a primary framebuffer.

20 Claims, 9 Drawing Sheets

(56) References Cited

FOREIGN PATENT DOCUMENTS

| JP | 2007219626 A1 | 8/2007 |
| JP | 2009015419 A1 | 1/2009 |
| WO | 2007/057053 A1 | 5/2007 |
| WO | 2008/125861 | 10/2008 |
| WO | 2009/017594 A2 | 2/2009 |

OTHER PUBLICATIONS

Final Notification of Reason for Refusal for Japanese Application No. 2010-094793 mailed Jan. 11, 2013.

Japan Patent Office, Notification of Reason for Refusal of Japanese Patent Application No. 2010-094793, Ref. No. P10VM001, Dispatch No. 637513, mailed Sep. 25, 2012, pp. 1-5.

European Patent Office, European Search Report and European Search Opinion dated Apr. 29, 2011.

Communication Pursuant to Article 94(3) EPC, received for European Application No. 10 158 464.7. Received Oct. 28, 2015.

Richardson et al: "Virtual Network Computing", EPO Form 2906 01.91 TRI IEEE Internet Computing, IEEE Service Center, New York, NY.—Institute of Electrical and Electronics Engineers, US, vol. 2, No. 1, Jan. 1, 1998, pp. 33-38.

* cited by examiner

METHOD AND SYSTEM FOR IDENTIFYING DRAWING PRIMITIVES FOR SELECTIVE TRANSMISSION TO A REMOTE DISPLAY

CROSS-REFERENCE TO RELATED APPLICATIONS

This application is a continuation of U.S. patent application Ser. No. 12/428,949 filed on Apr. 23, 2009, which issued as U.S. Pat. No. 8,902,242, the entirety of which is hereby incorporated by reference herein.

The present invention is related to U.S. patent application entitled "Method and System for Copying a Framebuffer for Transmission to a Remote Display" Ser. No. 12/428,971 and filed on the same day as the present application, which is hereby incorporated by reference.

BACKGROUND

Current operating systems typically include a graphical drawing interface layer that is accessed by applications in order to render drawings on a display, such as a monitor. The graphical drawing interface layer provides applications an application programming interface (API) for drawings and converts drawing requests by such applications into a set of drawing commands that it then provides to a video adapter driver. The video adapter driver, in turn, receives the drawing commands, translates them into video adapter specific drawing primitives and forwards them to a video adapter (e.g., graphics card, integrated video chipset, etc.). The video adapter receives the drawing primitives and immediately processes them, or alternatively, stores them in a First In First Out (FIFO) queue for sequential execution, to update a framebuffer in the video adapter that is used to generate and transmit a video signal to a coupled external display. One example of such a graphical drawing interface layer is the Graphical Device Interface (GDI) of the Microsoft® Windows operating system (OS), which is implemented as a number of user-level and kernel-level dynamically linked libraries accessible through the Windows OS.

With the rise of technologies such as server based computing (SBC) and virtual desktop infrastructure (VDI), organizations are able to replace traditional personal computers (PCs) with instances of desktops that are hosted on remote desktop servers (or virtual machines running thereon) in a data center. A thin client application installed on a user's terminal connects to a remote desktop server that transmits a graphical user interface of an operating system session for rendering on the display of the user's terminal One example of such a remote desktop server system is Virtual Network Computing (VNC) which utilizes the Remote Framebuffer (RFB) protocol to transmit framebuffers (which contain the values for every pixel to be displayed on a screen) from the remote desktop server to the client. In order to reduce the amount of display data relating to the graphical user interface that is transmitted to the thin client application, the remote desktop server may retain a second copy of the framebuffer that reflects a prior state of the framebuffer. This second copy enables the remote desktop server to compare a prior state and current state of the framebuffer in order to identify display data differences to encode (to reduce network transmission bandwidth) and subsequently transmit onto the network to the thin client application.

However, transmitting the display data differences onto the network to the thin client application can deteriorate performance of both the remote desktop server and the thin client application due to the computing overhead needed to encode the display data differences at the remote desktop server and subsequently decode them at the thin client application. As a general example, to continually transmit data from an entire framebuffer that supports a resolution of 1920×1200 and color depth of 24 bits per pixel onto the network at a rate of 60 times per second would require transmission of over 3.09 gigabits per second. Even assuming that display data differences (rather than an entire framebuffer) can be identified and further compressed through encoding techniques prior to transmission, significant network bandwidth may still be required.

SUMMARY

One or more embodiments of the present invention provide methods, in a server having a primary framebuffer for storing display data and a display encoder that uses a secondary framebuffer for transmitting display data to a remote client terminal, for reducing an amount of display data to be transmitted to the remote client terminal. In one such method, a queue comprising a list of completed drawing primitives is updated upon execution of drawing primitives into the primary framebuffer. The display encoder requests a list of drawing primitives that corresponds to updated display data in the secondary framebuffer and the requested list of drawing primitives is extracted from the queue and provided to the display encoder. Upon receipt of the requested list of drawing primitives, the display encoder is able to selectively transmit to the remote client terminal a drawing primitive in the requested list over updated display data in the secondary framebuffer corresponding to the drawing primitive depending upon a bandwidth usage assessment.

In one embodiment, each entry in the queue comprises a sequence number and a drawing primitive and the received request includes a sequence number corresponding to a last drawing primitive to update display data in the secondary framebuffer. In such an embodiment, the extracting step comprises identifying each entry in the queue including a sequence number up to and including the sequence number of the request.

DETAILED DESCRIPTION

Figure 1:
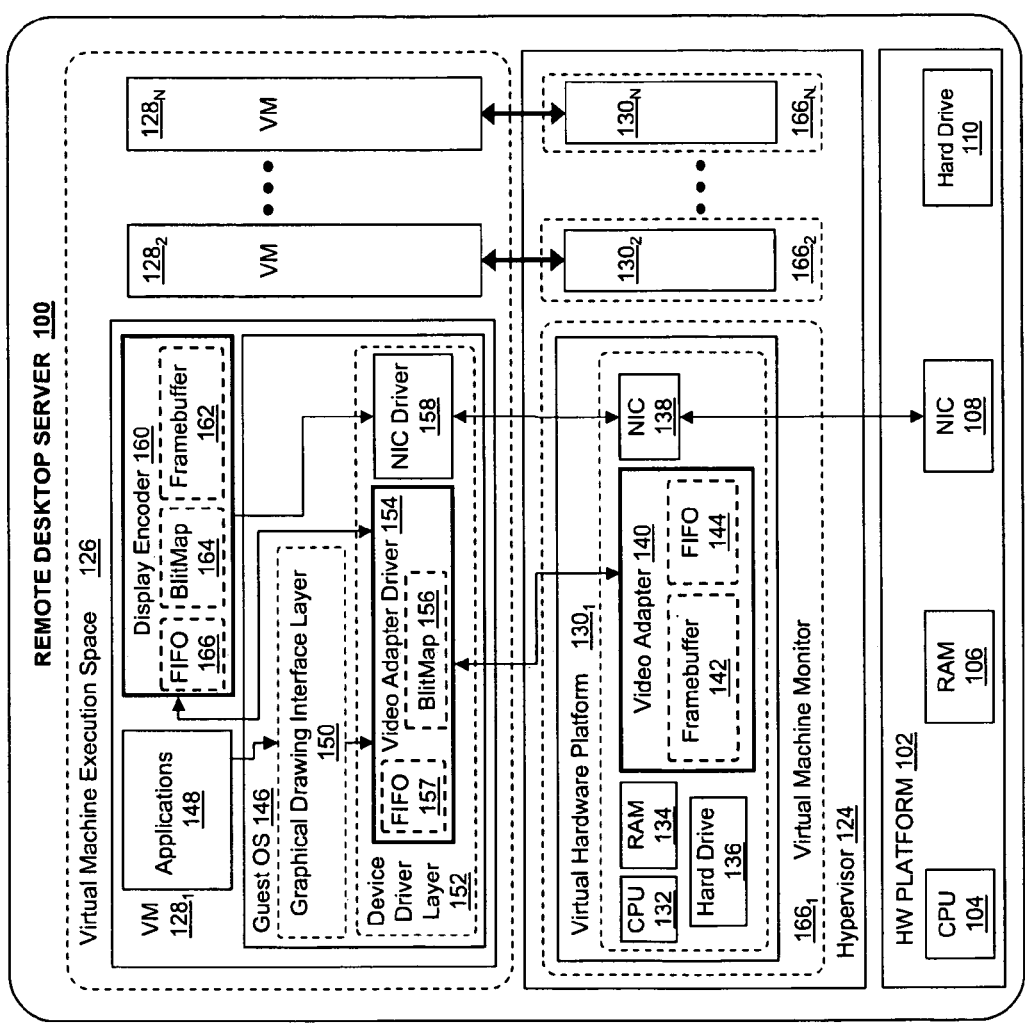
FIG. 1 depicts a block diagram of a remote desktop server, according to one embodiment of the invention.

FIG. 1 depicts a block diagram of a remote desktop server according to one embodiment of the invention. Remote desktop server 100 may be constructed on a desktop, laptop or server grade hardware platform 102 such as an x86 architecture platform. Such a hardware platform may include CPU 104, RAM 106, network adapter 108 (NIC 108), hard drive 110 and other I/O devices such as, for example and without limitation, a mouse and keyboard (not shown in FIG. 1).

A virtualization software layer, also referred to hereinafter as hypervisor 124, is installed on top of hardware platform 102. Hypervisor 124 supports virtual machine execution space 126 within which multiple virtual machines (VMs 128$_1$-128$_N$) may be concurrently instantiated and executed. In one embodiment, each VM 128$_1$-128$_N$ supports a different user who is remotely connected from a different client terminal. For each of VMs 128$_1$-128$_N$, hypervisor 124 manages a corresponding virtual hardware platform (i.e., virtual hardware platforms 130$_1$-130$_N$) that includes emulated hardware implemented in software such as CPU 132, RAM 134, hard drive 136, NIC 138 and video adapter 140. Emulated video adapter 140 allocates and maintains a framebuffer 142, which is a portion of memory used by video adapter 140 that holds a buffer of the pixel values from which a video display (i.e., "frame") is refreshed, and a First In First Out (FIFO) queue 144, which is a portion of memory used by video adapter 140 that holds a list of drawing primitives that are used to update framebuffer 142. In one embodiment, FIFO queue 144 is a shared memory buffer that is accessed and shared between video adapter 140 and video adapter driver 154.

Virtual hardware platform 130$_1$ may function as an equivalent of a standard x86 hardware architecture such that any x86 supported operating system, e.g., Microsoft Windows®, Linux®, Solaris® x86, NetWare, FreeBSD, etc., may be installed as guest operating system (OS) 146 to execute applications 148 for an instantiated virtual machine, e.g., VM 128$_1$. Applications 148 that require drawing on a display submit drawing requests through an API offered by graphical drawing interface layer 150 (e.g., Microsoft Windows® GDI, in one embodiment) which, in turn, converts the drawing requests into drawing commands and transmits the drawing commands to a video adapter driver 154 in device driver layer 152. As shown in the embodiment of FIG. 1, video adapter driver 154 allocates and maintains its own FIFO queue 157 to keep track of drawing primitives as well as a data structure 156, referred to hereinafter as a "blitmap" data structure that keeps track of potentially changed regions of framebuffer 142 of video adapter 140. Further details on the implementation and usage of blitmap data structures are detailed later in this Detailed Description. Device driver layer 152 includes additional device drivers such as NIC driver 158 that interact with emulated devices in virtual hardware platform 130$_1$ (e.g., virtual NIC 138, etc.) as if such emulated devices were the actual physical devices of hardware platform 102. Hypervisor 124 is generally responsible for taking requests from device drivers in device driver layer 152 that are received by emulated devices in virtual platform 130$_1$, and translating the requests into corresponding requests for real device drivers in a physical device driver layer of hypervisor 124 that communicates with real devices in hardware platform 102.

In order to transmit graphical user interfaces to the display of a remote client terminal, VM 128$_1$ further includes a display encoder 160 that interacts with video adapter driver 154 (e.g., through an API) to obtain data from framebuffer 142 for encoding (e.g., to reduce network transmission bandwidth) and subsequent transmission onto the network through NIC driver 158 (e.g., through virtual NIC 138 and, ultimately, through physical NIC 108). Display encoder 160 allocates and maintains a secondary framebuffer 162 for storing data received from framebuffer 142, its own blitmap data structure 164 (hereinafter, referred to as encoder blitmap data structure 164) for identifying changed regions in secondary framebuffer 162, and its own FIFO queue 166 for tracking drawing primitives whose execution resulted in the changed regions in secondary framebuffer 162. In one embodiment, display encoder 160 continuously polls video adapter driver 154 (e.g., 30 or 60 times a second, for example) to copy changes made in framebuffer 142 to secondary framebuffer 162 to transmit to the remote client terminal.

Those with ordinary skill in the art will recognize that the various terms, layers and categorizations used to describe the virtualization components in FIG. 1 may be referred to differently without departing from their functionality or the spirit of the invention. For example, virtual hardware platforms 130$_1$-130$_N$ may be considered to be part of virtual machine monitors (VMM) 166$_1$-166$_N$ which implement the virtual system support needed to coordinate operations between hypervisor 124 and corresponding VMs 128$_1$-128$_N$. Alternatively, virtual hardware platforms 130$_1$-130$_N$ may also be considered to be separate from VMMs 166$_1$-166$_N$, and VMMs 166$_1$-166$_N$ may be considered to be separate from hypervisor 124. One example of hypervisor 124 that may be used in an embodiment of the invention is included as a component of VMware's ESX™ product, which is commercially available from VMware, Inc. of Palo Alto, Calif. It should further be recognized that embodiments of the invention may be practiced in other virtualized computer systems, such as hosted virtual machine systems, where the hypervisor is implemented on top of an operating system.

Figure 2:
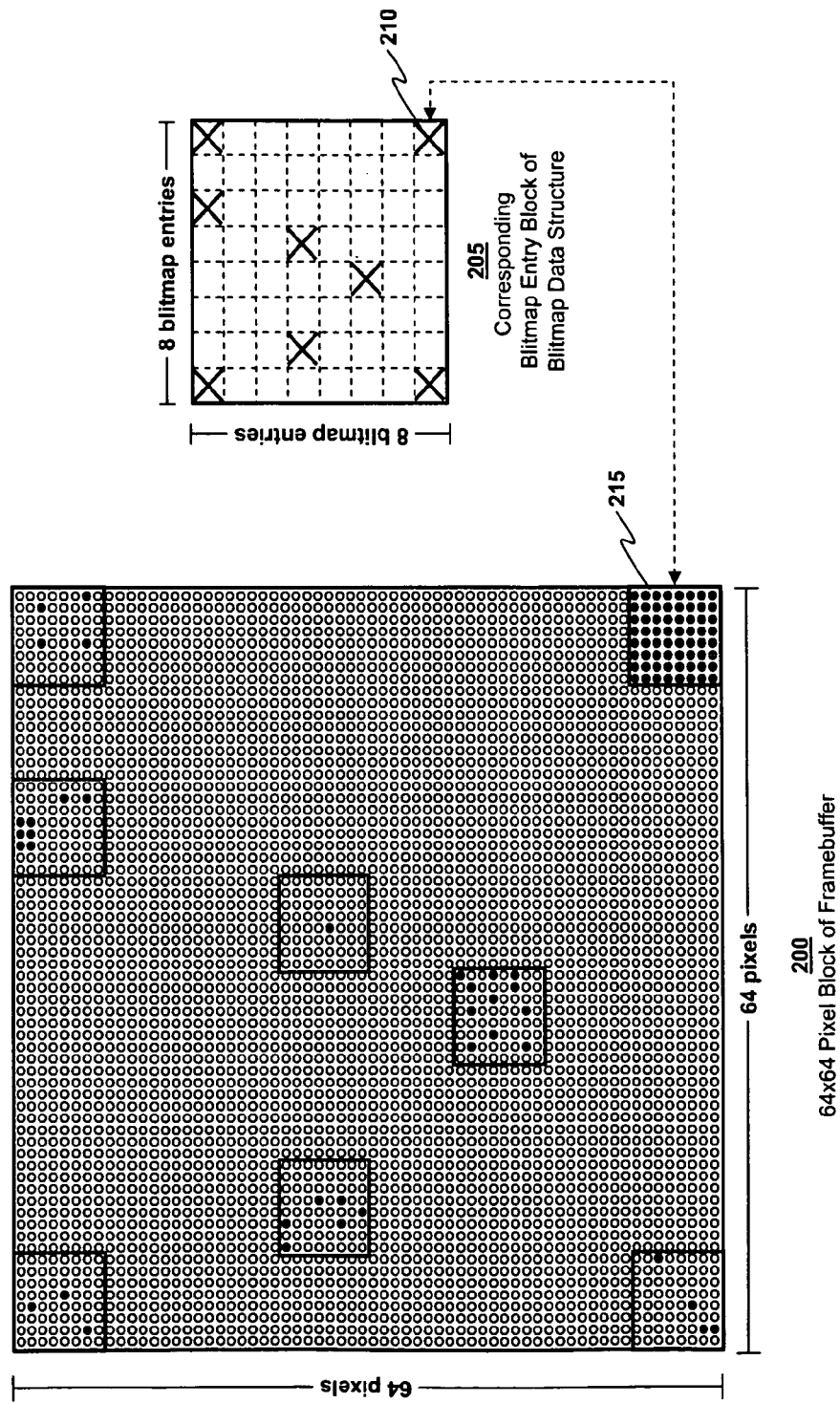
FIG. 2 depicts a "blitmap" data structure, according to one embodiment of the invention.

FIG. 2 depicts a blitmap data structure, according to one embodiment of the invention. Both video adapter driver 154 and display encoder 160 utilize a blitmap data structure to track changed regions of framebuffer 142 and secondary framebuffer 162, respectively. In the embodiment of FIG. 2, the blitmap data structure is a 2 dimensional bit vector where each bit (also referred to herein as a "blitmap entry") in the bit vector represents an N×N region of a corresponding framebuffer. A bit that is set (also referred to herein as a "marked" blitmap entry) in the bit vector indicates that at least one pixel value in the corresponding N×N region of the framebuffer has been changed during a particular interval of time (e.g., between polling requests by display encoder 160, for example). For example, FIG. 2 depicts a 64×64 pixel block 200 of a framebuffer where blackened dots represent pixel values that have changed during a particular interval of time. An 8×8 bit vector 205 represents a corresponding blitmap entry block of a blitmap data structure where each bit (or blitmap entry) corresponds to an 8×8 region in pixel block 200. A set bit (or marked blitmap entry) in bit vector 205 is represented by an "X." For example, marked blitmap entry 210 corresponds to framebuffer region 215 (all of whose pixel values have changed during a specified interval of time as indicated by the black dots). FIG. 2 illustrates other marked blitmap entries in bit vector 205 that correspond to regions in framebuffer pixel block 200 that have pixel values that have changed, as illustrated by blackened dots. By traversing a 2 dimensional bit vector embodiment of a blitmap data structure similar to 205 of FIG. 2, one can readily identify which N×N regions of a framebuffer have changed during a time interval (and also easily skip those regions that have not changed during the time interval).

Figure 3:
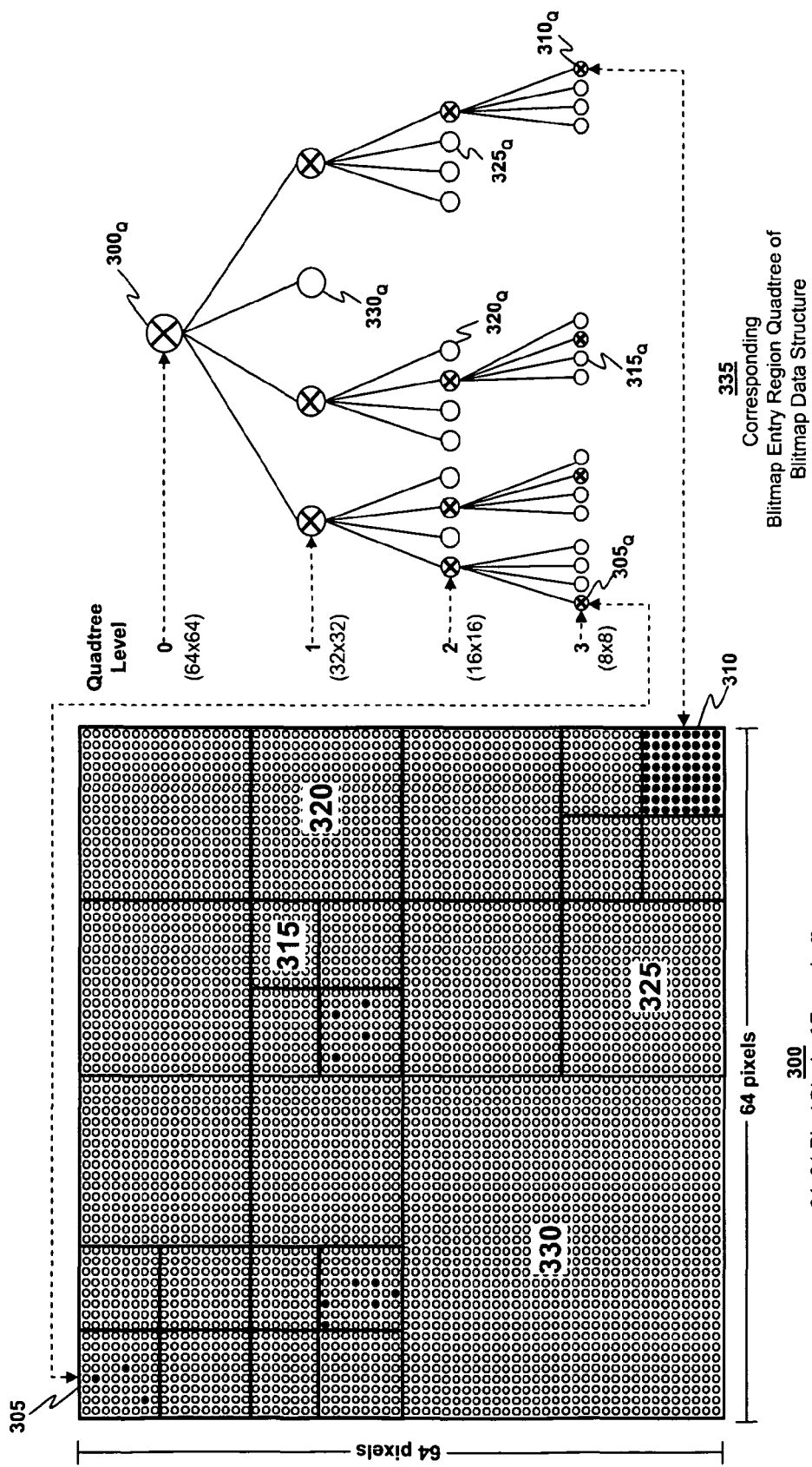
FIG. 3 depicts a second blitmap data structure, according to one embodiment of the invention.

FIG. 3 depicts a second blitmap data structure, according to one embodiment of the invention. In the embodiment of FIG. 3, the blitmap data structure is a region quadtree where each level of the tree represents a higher resolution bit vector of $2^N \times 2^N$ pixel blocks. FIG. 3 illustrates a 64×64 pixel block 300 of a framebuffer where blackened dots represent pixel values that have changed during a particular interval of time. A pixel block is successively subdivided into smaller and smaller sub-quadrants until each changed pixel (e.g., blackened dots) is contained within a smallest sub-quadrant. For example, in pixel block 300, the smallest sub-quadrant is an 8×8 pixel region, such as regions 305, 310 and 315. Larger sub-quadrants include 16×16 sub-quadrants, such as 320 and 325, as well as 32×32 sub-quadrants, such as 330. A four-level region quadtree 335 represents a blitmap data structure that corresponds to 64×64 pixel block 300 of the framebuffer. As depicted in FIG. 3, each level of region quadtree 335 can be implemented as a bit vector whose bits correspond to a sub-quadrant of a particular size in pixel block 300, ranging from 64×64 to 8×8, depending upon the level of the bit vector. A node in region quadtree 335 that is marked with an "X" indicates that at least one pixel value in the node's corresponding sub-quadrant in pixel block 300 has been changed during the particular interval of time (i.e., has a blackened dot). For example, node $300_Q$ of level 0 (the 64×64 level) of region quadtree 335 represents the entirely of 64×64 pixel block and is marked with an "X" since at least one pixel value in pixel block 300 has changed. In contrast, node $330_Q$ of level 1 (the 32×32 level) of region quadtree 335 represents 32×32 sub-quadrant 330 and is unmarked since no pixel values in sub-quadrant 330 have changed. Similarly, nodes $320_Q$ and $325_Q$ of level 2 (the 16×16 level) represent 16×16 sub-quadrants 320 and 325, respectively, and are unmarked since no pixel values in sub-quadrants 320 and 325 have changed. Nodes $305_Q$, $310_Q$ and $315_Q$ of level 3 (the 8×8 level) correspond to 8×8 regions 305, 310 and 315 of pixel block 300, respectively, and are marked accordingly. In a region quadtree embodiment of a blitmap data structure, such as the embodiment of FIG. 3, each node in the deepest level of the region quadtree (i.e., corresponding to the smallest sub-quadrant, such as an 8×8 pixel region) is a blitmap entry. By traversing a region quadtree embodiment of a blitmap data structure, one can readily identify which 8×8 regions (or other smallest sized sub-quadrant) of a framebuffer have changed during a time interval. Furthermore, due to its tree structure, one can also quickly skip large sized sub-quadrants in the framebuffer that have not changed during the time interval. It should further be recognized that a region quadtree embodiment of a blitmap data structure may further conserve memory used by the blitmap data structure, depending upon the particular implementation of the region quadtree. For example, while the 2 dimensional bit vector embodiment of a blitmap data structure 205 of FIG. 2, consumes 64 bits no matter how many 8×8 regions may be unmarked, region quadtree 335 of FIG. 3 consumes fewer bits when fewer 8×8 regions are marked. As depicted, the implementation of blitmap data structure 205 utilizes 64 bits while blitmap data structure 335 utilizes 33 bits. It should be recognized that encoder blitmap data structure 164 and driver blitmap data structure 156 may each be implemented using a variety of different data structures, including those of FIGS. 2 and 3, and that in any particular embodiment, encoder blitmap data structure 164 may use a different data structure than driver blitmap data structure 156.

Figure 4:
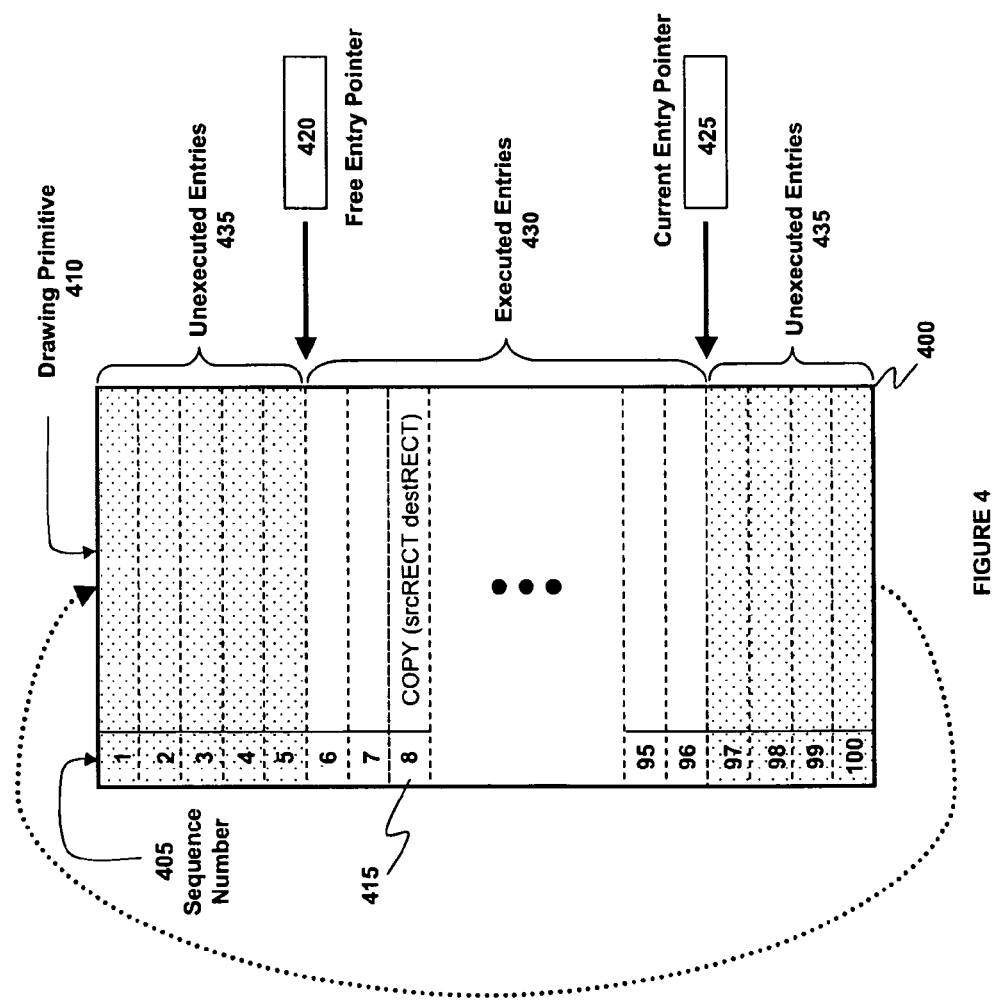
FIG. 4 depicts a FIFO queue, according to one embodiment of the invention.

FIG. 4 depicts a FIFO queue, according to one embodiment of the invention. Video adapter 140, video adapter driver 154, and display encoder 160 each utilize a FIFO queue to keep track of drawing primitives of framebuffer 142 (for video adapter 140 and video adapter driver 154) and secondary framebuffer 162 (for display encoder 160). FIFO queue 400 of FIG. 4 is a circular buffer of size 100 where each entry in FIFO queue 400 includes a sequence number 405 and a drawing primitive 410. In one embodiment, examples of drawing primitives include basic drawing instructions such as copy (e.g., rectangular area to another rectangular area), fill (e.g., a rectangular area with a color), update (e.g., an existing rectangular area with new display data) and the like. As an example, FIFO queue entry 415 has a sequence number of 8 and a drawing primitive that instructs video adapter 140 to copy the contents of a source rectangle in an area of framebuffer 142 to a destination rectangle in another area of framebuffer 142. Free entry pointer 420 points to the next entry in FIFO queue 400 to insert a new entry (i.e., queue entry 6) and is incremented every time a new entry is inserted into FIFO queue 400. Current entry pointer 425 points the next entry in FIFO queue 400 that is to be executed by video adapter 140 (i.e., queue entry 97) and is incremented every time video adapter 140 completes execution of a drawing primitive. As shown in FIG. 4, queue entries 6 through 96 represent the set of queue entries whose drawing primitives have been already executed by video adapter 140 (referred to as executed entries 430) and queue entries 1 through 5 and 97 through 100 represent the set of queue entries than contain unexecuted drawing primitives or otherwise empty entries (referred to as unexecuted entries 435). It should be recognized that alternative embodiments of FIFO queues may be used as any of FIFO queues 144, 157 and 166. For example, in one embodiment, FIFO queue 144 in video adapter 140 may not have sequence numbers. Similarly, in an alternative embodiment, each drawing primitive stored in a FIFO queue consumes the same amount of bytes (e.g., 24 bytes, for example) such that sequence numbers can be derived (rather than stored as a filed of a queue entry) by determining an offset from a starting point in the queue.

Figure 5:
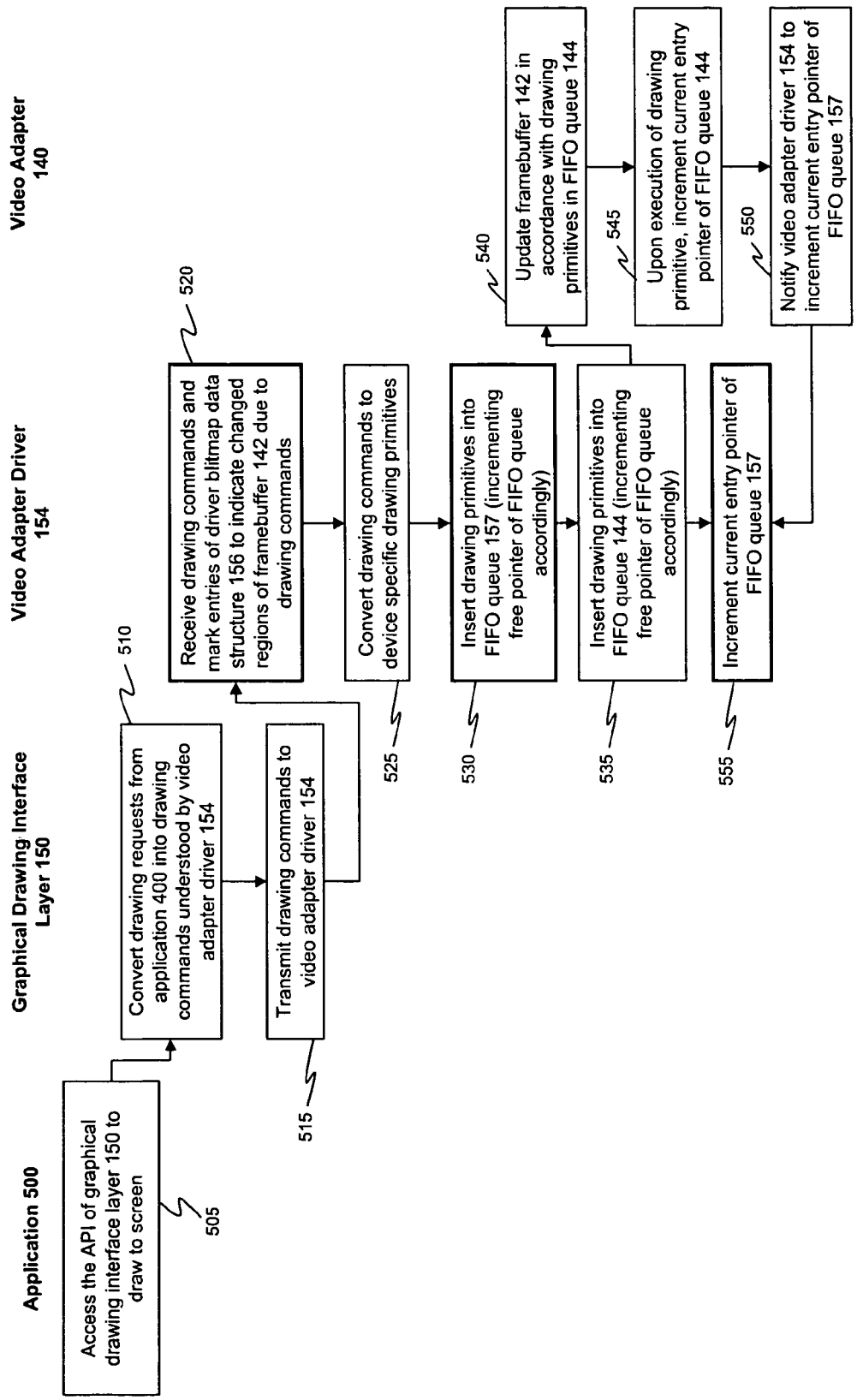
FIG. 5 is a flow diagram depicting steps to transmit drawing requests from an application to a video adapter, according to one embodiment of the invention.

FIG. 5 is a flow diagram depicting steps to transmit drawing requests from an application to a video adapter, according to one embodiment of the invention. Although the steps are described with reference to the components of remote desktop server 100 in FIG. 1, it should be recognized that any system configured to perform the steps, in any order, is consistent with the present invention.

According to the embodiment of FIG. 5, in step 505, during its execution, application 500 (i.e., one of applications 148 running on guest OS 146) accesses the API of graphical drawing interface layer 150 (e.g., GDI in Microsoft Windows) to submit drawing requests to a screen, for example, to update its graphical user interface in response to a user action. In step 510, through guest OS 146, graphical drawing interface layer 150 receives the drawing requests and converts them into drawing commands that are understood by video adapter driver 154. In step 515, graphical drawing interface layer 150 transmits the drawing commands to video adapter driver 154. In step 520, video adapter driver 154 receives the drawing commands and marks entries of driver blitmap data structure 156 to indicate that at least a portion of pixel values in regions of framebuffer 142 corresponding to the marked entries of driver blitmap data structure 156 will be updated as a result of executing the drawing commands. In one embodiment, video adapter driver 154 calculates or otherwise determines an area within framebuffer 142, such as a rectangle of minimum size that encompasses the pixels that will be updated as a result of executing the drawing commands (i.e., also referred to herein as a "bounding box"). Video adapter driver 154 is then able to identify and mark all blitmap entries in driver blitmap data structure 156 corresponding to regions of framebuffer 154 that include pixel values in the determined area. In step 525, video adapter driver 154 converts the drawing commands to device specific drawing primitives and, in step 530, inserts the device specific drawing primitives into its FIFO queue 157, accordingly incrementing the free entry pointer of FIFO queue 157. In step 535, video adapter driver 154 then inserts the drawing primitives into FIFO queue 144 (e.g., in an embodiment where FIFO queue 144 is shared between video adapter driver 154 and video adapter 140) and accordingly increments the free entry pointer of FIFO queue 144. In step 540, video adapter 140 updates framebuffer 142 in accordance with the drawing primitives in FIFO queue 144 when they are ready to be acted upon. Specifically, in step 545, once video adapter 140 completes executing a drawing primitive, it increments the current entry pointer of its FIFO queue 144 and in step 550 notifies video adapter driver 154 to increment the current entry pointer of FIFO queue 157, which video adapter driver 154 does in step 555.

Figure 6:
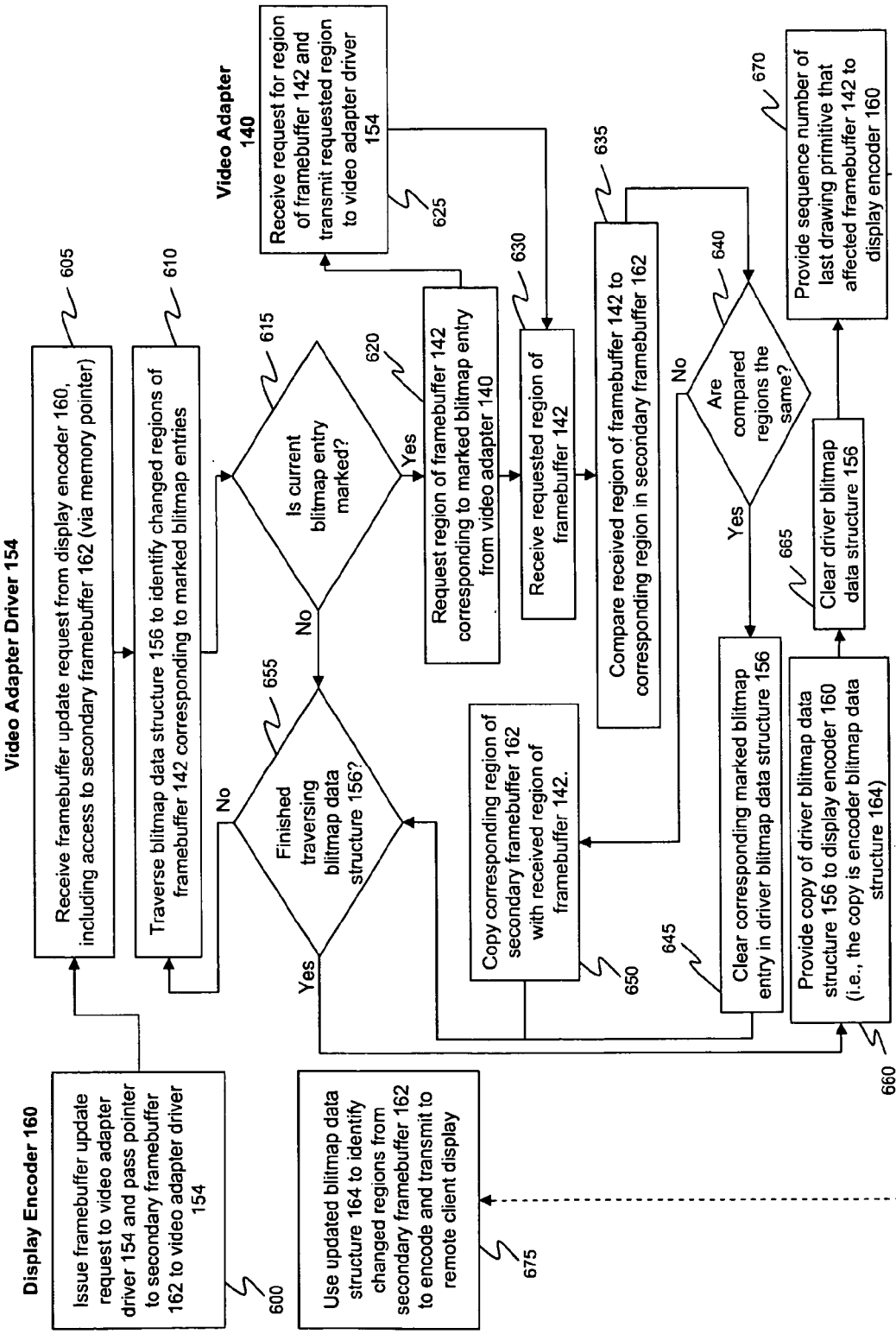
FIG. 6 is a flow diagram depicting steps to transmit framebuffer data from a video adapter to a display encoder, according to one embodiment of the invention.

FIG. 6 is a flow diagram depicting steps to transmit framebuffer data from a video adapter to a display encoder, according to one embodiment of the invention. Although the steps are described with reference to the components of remote desktop server 100 in FIG. 1, it should be recognized that any system configured to perform the steps, in any order, is consistent with the present invention.

According to the embodiment of FIG. 6, display encoder 160 is a process running on guest OS 146 which continually polls (e.g., 30 or 60 times a second, for example) video adapter driver 154 to obtain data in framebuffer 154 of video adapter 140 to encode and transmit onto the network (e.g., through NIC driver 158) for receipt by a remote client terminal. In step 600, display encoder 160, via an API routine exposed to it by video adapter driver 154, issues a framebuffer update request to video adapter driver 154 and passes to video adapter driver 154 a memory reference (e.g., pointer) to secondary framebuffer 162 to enable video adapter driver 154 to directly modify secondary framebuffer 162. In step 605, video adapter driver 154 receives the framebuffer update request and, in step 610, it traverses driver blitmap data structure 156 to identify marked blitmap entries that correspond to regions of framebuffer 142 that have changed since the previous framebuffer update request from display encoder 160 (due to drawing requests from applications as described in FIG. 5). If, in step 615, a current blitmap entry is marked, then, in step 620, video adapter driver 154 requests the corresponding region (i.e., the pixel values in the region) of framebuffer 142 from video adapter 140. In step 625, video adapter 140 receives the request and transmits the requested region of framebuffer 142 to video adapter driver 154.

In step 630, video adapter driver 154 receives the requested region of framebuffer 142 and, in step 635, compares the pixel values in the received requested region of framebuffer 142 to the pixel values of the corresponding region in secondary framebuffer 162, which reflects a previous state of the framebuffer 142 upon completion of the response of video adapter driver 154 to the previous framebuffer update request from display encoder 160. This comparison step 635 enables video adapter driver 154 to identify possible inefficiencies resulting from visually redundant transmissions of drawing requests by applications as described in FIG. 5. For example, perhaps due a lack of focus on optimizing drawing related aspects of their functionality, some applications may issue drawing requests in step 505 of FIG. 5 that redundantly redraw their entire graphical user interface even if only a small region of the graphical user interface was actually modified by the application. Such drawing requests cause entries in driver blitmap data structure 156 to be marked in step 520 of FIG. 5 even if the corresponding framebuffer 142 regions of the marked blitmap entries need not be updated with new pixel values (i.e., the regions correspond to parts of the graphical user interface that are not actually modified). With such marked blitmap entries, comparison step 635 will reveal that the regions of framebuffer 142 and secondary framebuffer 162 corresponding to the marked blitmap entries are the same since the pixel values of such regions did not change due to visually redundant drawing requests submitted by applications (in step 505) after completion of video adapter driver's 154 response to the previous framebuffer update request from display encoder 160.

Figure 7:
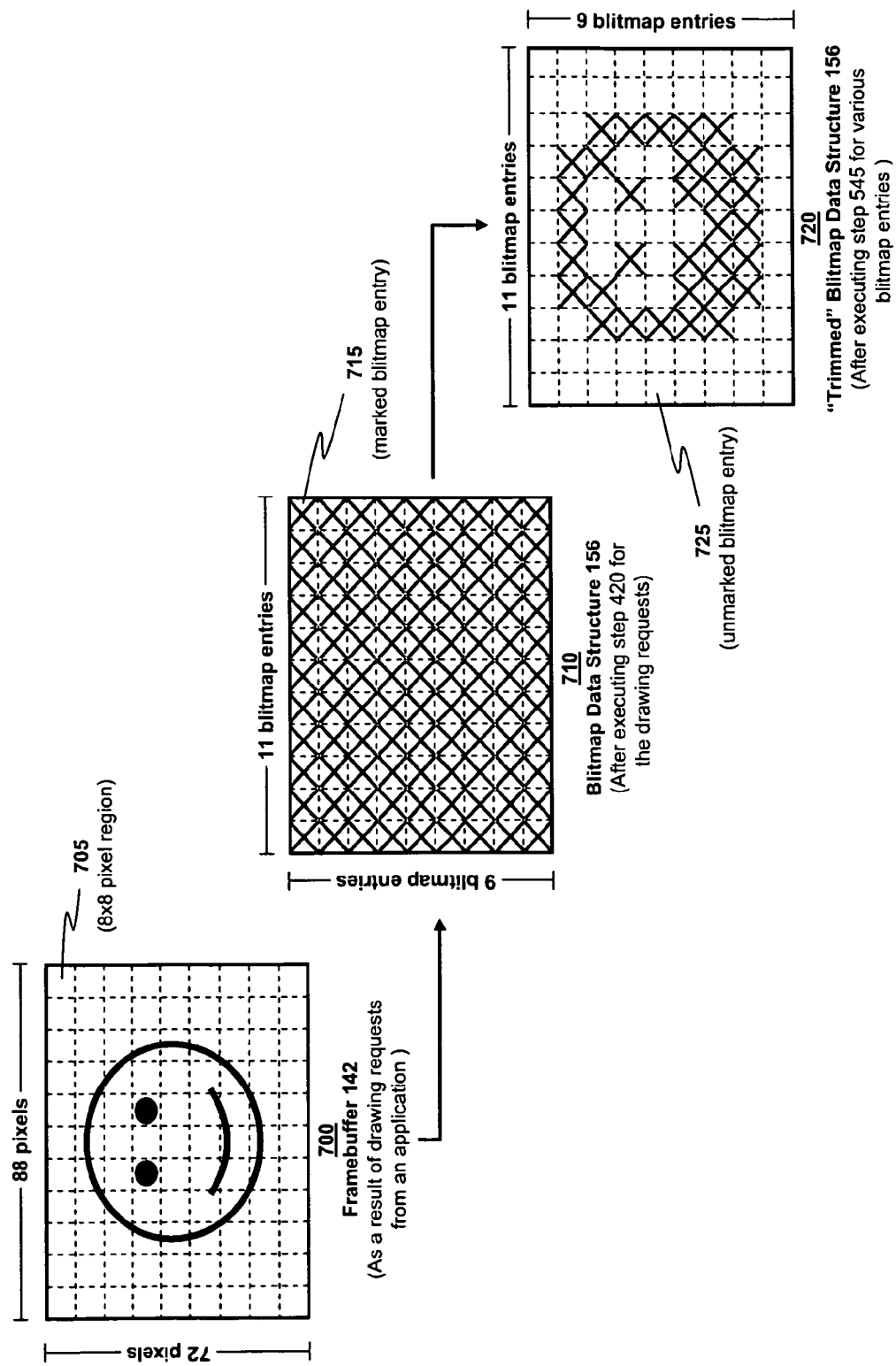
FIG. 7 depicts an example of trimming a blitmap data structure, according to one embodiment of the invention.

As such, in step 640, if comparison step 635 indicates that the regions of framebuffer 142 and secondary framebuffer 162 are the same, then in step 645, video adapter driver 154 "trims" driver blitmap data structure 156 by clearing the marked blitmap entry to indicate that no actual pixel values were changed in the corresponding region of framebuffer 142 since completion of video adapter driver's response to the previous framebuffer update request from display encoder 160. FIG. 7 depicts an example of trimming a blitmap data structure, according to one embodiment of the invention. FIG. 7 illustrates a 88×72 pixel block 700 of framebuffer 142. Each subdivided block, such as 705, represents an 8×8 pixel region that corresponds to a blitmap entry in driver blitmap data structure 156. As depicted in FIG. 7, an application has issued drawing requests pursuant to step 505 of FIG. 5 in order to draw a smiley face as depicted in pixel block 700. However, the drawing requests issued by the application inefficiently request that the entirety of pixel block 700 gets redrawn, rather than just requesting the drawing of the specific pixels of the smiley face itself. As such, each of the blitmap entries in a corresponding 11×9 blitmap block 710 of driver blitmap data structure 156 are marked by video adapter driver 154 pursuant to step 420 of FIG. 5 (such as marked blitmap entry 715). However, when display encoder 160 issues a framebuffer update request to video adapter driver 154, as described herein in relation to FIG. 6, video adapter driver 154 is able to trim blitmap block 710, thereby creating blitmap block 720, by clearing blitmap entries, such as unmarked blitmap 725, whose corresponding regions in framebuffer 142 were not actually changed (i.e., did not contain a smiley face modified pixel) pursuant to step 645 of FIG. 6.

Returning to FIG. 6, if, however, in step 640, the comparison step 635 indicates that the regions of framebuffer 142 and secondary framebuffer 162 are different (i.e., actual pixel values in the region of framebuffer 142 have changed as a result of drawing requests of applications in step 505 since completing the response to the previous framebuffer update request from display encoder 160), then in step 650, video adapter driver 154 copies the pixel values in the region of framebuffer 142 to the corresponding region of secondary framebuffer 162 to properly reflect in secondary framebuffer 162 the changed pixel values in the region of framebuffer 142. In step 655, if video adapter driver 154 has not completed traversing driver blitmap data structure 156, the flow returns to step 610. If, in step 655, video adapter driver 154 has completed traversing driver blitmap data structure 156, then in step 660, video adapter driver 154 provides a copy of driver blitmap data structure 156 to display encoder 160, which becomes and is referred to herein as encoder blitmap data structure 164. To the extent that marked blitmap entries were cleared in driver blitmap data structure 156 in step 645, encoder blitmap data structure 164 reflects a more optimized view of regions in secondary framebuffer 162 that have actual changed pixel values. In step 665, video adapter driver 154 clears all the marked blitmap entries in driver blitmap data structure 156 in preparation for receiving a subsequent framebuffer update request from display encoder 160. In step 670, video adapter driver 154 provides to display encoder 160 the sequence number of the last drawing primitive in FIFO queue 157 to have been executed into framebuffer 142 upon issuance of the framebuffer update request in step 600, indicating to display encoder 160 that it has completed its response to the framebuffer update request issued in step 600. In the FIFO queue embodiment of FIG. 4, for example, the sequence number provided to display encoder 160 in step 670 is 96, which represents the queue entry immediately before the queue entry pointed to by current entry pointer 425.

Upon completion of video adapter driver's 154 response to framebuffer update request issued by display encoder 160 in step 600, secondary framebuffer 162 contains all changed pixel values resulting from drawing requests from applications (from step 505 of FIG. 5) since the completed response to the previous framebuffer update request from display encoder 160 and encoder blitmap data structure 164 contains marked blitmap entries that indicate which regions within secondary framebuffer 162 contain such changed pixel values.

Figure 8:
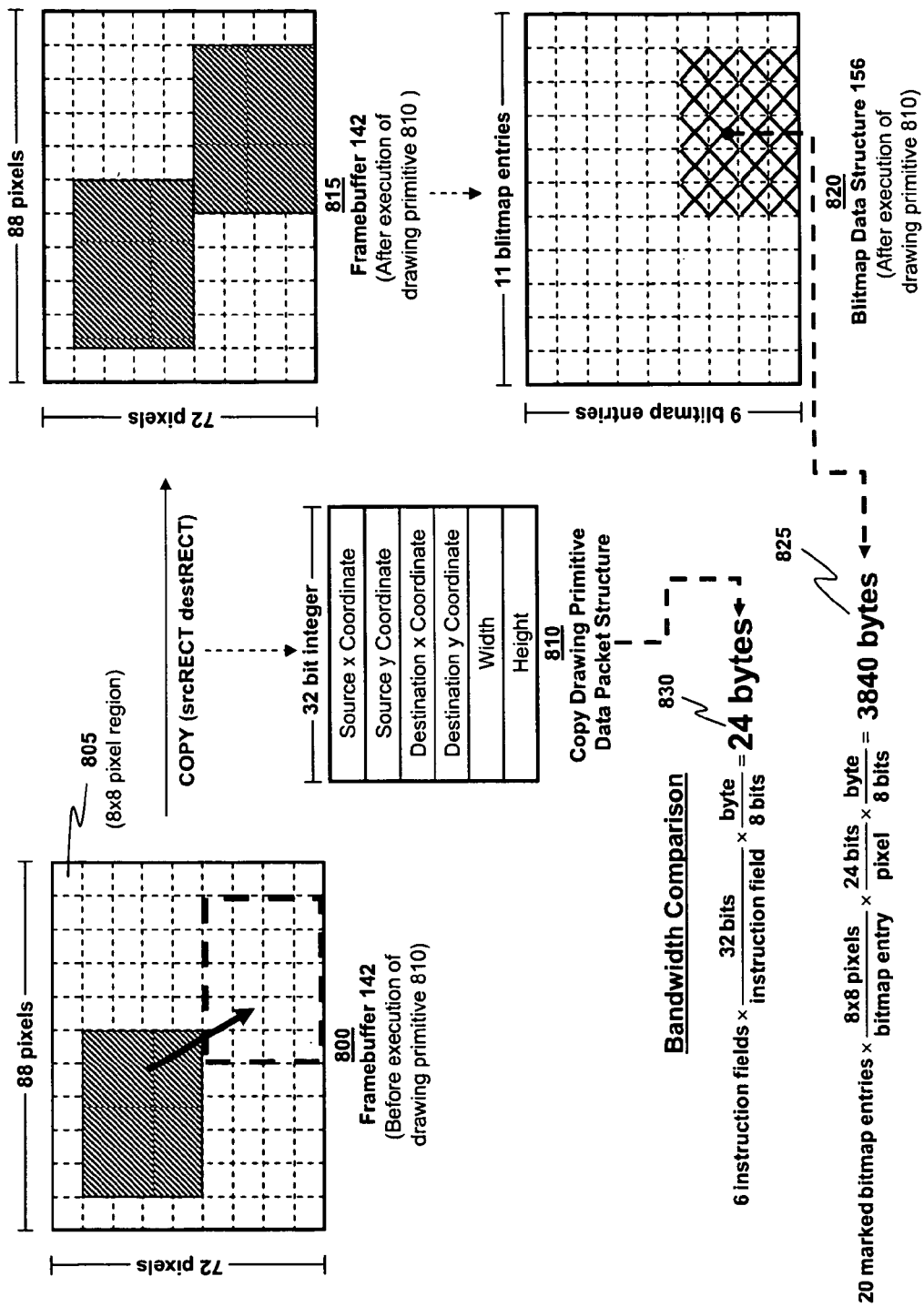
FIG. 8 illustrates one example of bandwidth savings by transmitting a drawing primitive to a remote client display rather than transmitting corresponding display data changes made to the framebuffer.

With such information, in step 675, display encoder 160 can traverse encoder blitmap data structure 164 for marked blitmap entries and extract only those regions in secondary framebuffer 162 that correspond to such marked blitmap entries for encoding and transmission to a remote client display. However, in one embodiment, display encoder 160 can further reduce the amount of bandwidth required to transmit changes to framebuffer 142 to the remote client display by selectively transmitting drawing primitives that describe changes made to framebuffer 142 rather than transmitting the actual corresponding display data changes that are reflected in secondary framebuffer 162. FIG. 8 illustrates one example of bandwidth savings by transmitting a drawing primitive to a remote client display rather than transmitting corresponding display data changes made to the framebuffer. Block 800 represents an 88×72 pixel block 800 of framebuffer 142. Each subdivided block, such as 805, represents an 8×8 pixel region that corresponds to a blitmap entry in driver blitmap data structure 156. As depicted in FIG. 8, video adapter 140 is about to execute a "copy" drawing primitive 810 of a queue entry in FIFO queue 140 to copy an existing rectangle to another region of pixel block 800 (i.e., similar to queue entry 415 of FIG. 4). Upon executing drawing primitive 810, pixel block 800 of framebuffer 142 is transformed into pixel block 815 (i.e., the rectangle has been copied to the new region of the pixel block).

Similarly, in accordance with step 520 of FIG. 5, driver blitmap data structure 156 is also updated as illustrated by blitmap data structure 820. While equation 825 reveals that transmitting the changed display data in framebuffer 142 to a remote client terminal would involve transmitting about 3840 bytes in uncompressed format, equation 830 reveals that transmitting the drawing primitive 810 itself would involve transmitting only about 24 bytes (i.e., wherein the remote client terminal would execute the received drawing primitive to obtain the display data). Furthermore, while compression encoding techniques can reduce the amount of display data transmitted, even an optimal compression technique that reduces the size of the uncompressed format by a factor of, for example, 100, would still require transmission 38.4 bytes which remains larger than the 24 byte drawing primitive. Another benefit is reduced CPU time. For example, while it may be possible to use display compression display data to a size as small or even smaller than the corresponding display primitive, transmitting the display primitive requires significantly less CPU time then the necessary compression algorithm.

Figure 9:
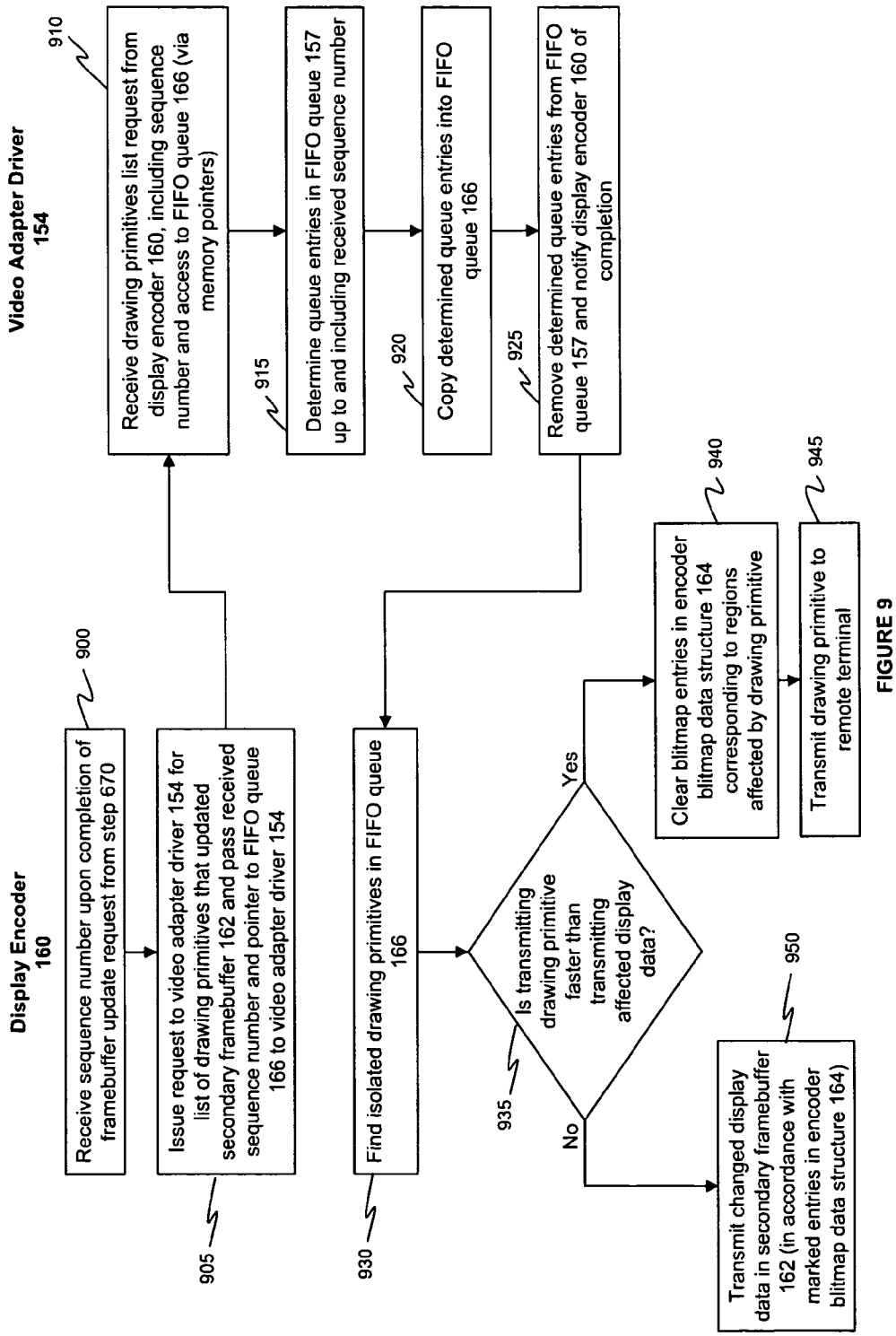
FIG. 9 is a flow diagram depicting steps to transmit drawing primitives from a video adapter driver to a display encoder, according to one embodiment of the invention.

FIG. 9 is a flow diagram depicting steps to transmit drawing primitives from a video adapter driver to a display encoder, according to one embodiment of the invention. Although the steps are described with reference to the components of remote desktop server 100 in FIG. 1, it should be recognized that any system configured to perform the steps, in any order, is consistent with the present invention.

In step 900, display encoder 160 receives the sequence number transmitted by video adapter driver 154 upon completion of a framebuffer update request in step 670 of FIG. 6. In step 905, display encoder 160 then transmits the sequence number and a memory reference to FIFO queue 166 to video adapter driver 154 in a request for a list of drawing primitives relating to the updated display data contained in secondary framebuffer 162 received in step 900. When video adapter driver 154 receives the request in step 910, it determines, in step 915, those queue entries of its FIFO queue 157 that have sequence numbers up to (and including) the sequence number received in the request and copies those queue entries into FIFO queue 166 for access by display encoder 160. For example, in one embodiment, FIFO queue 157 of video adapter driver 154 is updated according to the steps of FIG. 5 (i.e., steps 530 and 555) and is implemented in a manner similar to FIFO queue 400 of FIG. 4 and video adapter driver 154 further stores a copy of a prior sequence number that was transmitted to display encoder 160 in step 670 of FIG. 6 for the framebuffer update request immediately prior to the current framebuffer update request that resulted in the issuance of the drawing primitives list request of step 900 by display encoder 160. This prior sequence number represents the sequence number of the last drawing primitive in FIFO queue 157 that was utilized to update framebuffer 142 in the framebuffer update request immediately prior to the current framebuffer update request. As such, those drawing primitives in queue entries of FIFO queue 157 having sequence numbers subsequent to this sequence number and up to (and including) the sequence number received in step 905 represent the display primitives that updated display data copied to secondary framebuffer 162 in step 650 of FIG. 6. In such an embodiment, video adapter driver 154 copies the queue entries of these display primitives from its FIFO queue 157 to FIFO queue 166 in step 920. In step 925, video adapter driver 154 then clears or otherwise removes these queue entries from its own FIFO queue 157 and notifies display encoder 160 that is has completed responding to the drawing primitives list request from step 905.

It should be recognized that alternative embodiments may utilize a different implementation of FIFO queue 157 that is updated in manner different from the process of FIG. 5. For example, in one alternative embodiment, drawing primitives are not inserted into FIFO queue 157 in step 530. Rather, only drawing primitives that have been completed by video adapter 140 in step 550 are inserted into FIFO queue 157. Specifically, step 550 is modified such that video adapter 140 transmits the completed drawing primitives to video adapter driver 154 which then inserts them into its FIFO queue 157. In such an embodiment, FIFO queue 157 can be implemented as a simple vector buffer and does not need a free entry pointer 420 or current entry pointer 425. Specifically, all the entries from the beginning of FIFO queue 157 up to the requested sequence number are provided to display encoder 160 in step 910 and in step 915, the remaining entries are shifted to the beginning of FIFO queue 157 after removal of the provided entries in step 925.

After step 925, display encoder 160 has access to updated display data in secondary framebuffer 162, an encoder blitmap data structure 164 that indicates which regions of secondary framebuffer 162 include updated display data, and a FIFO queue 166 that includes a list of drawing primitives that effectuated the updated display data in secondary framebuffer 162. As such, display encoder 160 is able to determine the more efficient method of propagating display data changes to a remote client terminal between transmitting the updated display data itself or transmitting the data primitives effectuating the updated display data. For example, returning to the embodiment of FIG. 9, in step 930, display encoder 160 reviews the list of drawing primitives in FIFO queue 166 to identify isolated drawing primitives that draw into framebuffer regions that are not drawn into by other drawing primitives in FIFO queue 166. In step 935, if transmitting an identified drawing primitive is faster than transmitting the amount of display data affected by such drawing primitive, then in step 940, display encoder 160 clears those blitmap entries in encoder blitmap data structure 164 corresponding to the regions of framebuffer 162 affected by the drawing primitive and, in step 945, transmits the drawing primitive to the remote client terminal. If, in step 935, display encoder 160 determines that it is more efficient to transmit the display data rather than the identified drawing primitive, then in step 950, display encoder transmits the display data in secondary framebuffer 162 (i.e., in accordance with the marked entries in encoder blitmap data structure 164). It should be recognized that various methods may be utilized by display encoder 160 to determine in step 935 whether to transmit updated display data or corresponding drawing primitives to the remote client terminal consistent with the teachings herein. For example, in one embodiment, display encoder 160 compares the amount of display data affected by a drawing primitive identified in step 930 to the size of the drawing primitive itself. In an alternative embodiment, certain display primitives (e.g., copy or fill drawing primitives, for example) are assumed to be more efficient to transmit that the affected display data. It should be recognized that any number of heuristics may be used to determine whether to send the drawing primitive or the affected display data consistent with the teachings herein.

It should be recognized that various modifications and changes may be made to the specific embodiments described herein without departing from the broader spirit and scope of the invention as set forth in the appended claims. For example, although FIG. 1 depicts an embodiment where display encoder 160 and video adapter driver 154 run in a virtual machine $128_1$ that communicates with a virtual video adapter 140 in a hypervisor 124, it should be recognized that embodiments of the invention may be deployed in any remote desktop server architecture, including non-virtual machine based computing architectures. Furthermore, rather than having display encoder 160 and virtual video adapter 140 as software components of the server, alternative embodiments may utilize hardware components for each or either of them. Similarly, it should be recognized that alternative embodiments may not require any virtual video adapter. Instead, in such alternative embodiments, for example, video adapter driver 154 may allocate and manage framebuffer 142 and FIFO queue 144 itself. Similarly, it should be recognized that FIFO queue 166 may not be required in alternative embodiments. Instead, in such alternative embodiments, display encoder 160 is able to directly access FIFO queue 157 of video adapter driver 154, for example, through its own read pointers. It should be similarly recognized that various other data structures and buffers described herein can be allocated and maintained by alternative system components without departing from the spirit of the invention. For example, rather than having display encoder 160 allocate and maintain secondary framebuffer 162 and pass a memory reference to video adapter driver 154 as detailed in step 600 of FIG. 6, video adapter driver 154 may allocate and maintain secondary framebuffer 162 (as well as encoder blitmap data structure 164) and provide memory reference access to display encoder 160 in an alternative embodiment. Additionally, it should be recognized that some of the functionality and steps performed by video adapter driver 154 as described herein can be implemented in a separate extension or component to a pre-existing or standard video adapter driver (i.e., display encoder 160 may communicate with such a separate extension to the video adapter driver rather than the pre-existing video adapter driver itself). Similarly, it should be recognized that alternative embodiments may vary the amount and types of data exchanged between system components as described herein or utilize known optimization techniques without departing from the spirit of the invention. For example, rather than having display encoder 160 transmit a sequence number to video adapter driver 154 in step 905 of FIG. 9, an alternative embodiment, in an alternative embodiment, video adapter driver 154 internally keeps track of the previous drawing primitives that it has provided to display encoder in prior iterations of step 920 such that it is able to provide the relevant drawing primitive to display encoder 160 without needing a sequence number. Additionally, rather than providing a copy of driver blitmap data structure 156 as encoder blitmap data structure 164 in step 660 of FIG. 6, an alternative embodiment may provide only relevant portions of driver blitmap data structure 156 to display encoder 160 or otherwise utilize an alternative data structure to provide such relevant portions of driver blitmap data structure 156 to display encoder 160. Similarly, an alternative embodiment may not have a FIFO queue 157 in video adapter driver 154, but rather request FIFO queue entries from FIFO queue 144 through video adapter 140. Similarly, rather than (or in addition to) having display encoder 160 continuously poll video adapter driver 154, in alternative embodiments, video adapter driver 154 can trigger an interrupt to display encoder 160 upon step 555 of FIG. 5 to notify display encoder 160 of receipt of a drawing primitive that has updated framebuffer 142. In this manner, display encoder 160 need not issue continuous requests to video adapter driver 154, for example, if the framebuffer 142 is not changing.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A system comprising:
one or more computers having a primary framebuffer and a display encoder that uses a second framebuffer to transmit display data, wherein the one or more computers are configured to:
update a queue of completed drawing primitives upon execution of drawing primitives into the primary framebuffer;
receive a request from the display encoder for a list of drawing primitives that corresponds to updated display data in the secondary framebuffer;
provide the requested list of drawing primitives to the display encoder;
determine a first bandwidth usage for transmitting a drawing primitive from the requested list;
determine a second bandwidth usage for transmitting the updated display data corresponding to the drawing primitive from the secondary framebuffer; and
transmit either the drawing primitive or the updated display data in the secondary framebuffer to a client terminal based on which of the first bandwidth usage and the second bandwidth usage is lesser.

2. The system of claim 1, wherein the one or more computers are configured to remove the requested list of drawing primitives from the queue.

3. The system of claim 1, wherein the request from the display encoder includes a sequence number corresponding to a last drawing primitive to update display data in the secondary framebuffer.

4. The system of claim 1, wherein providing the requested list of drawing primitives comprises extracting the requested list of drawing primitives from the queue, wherein extracting includes identifying each entry in the queue including a sequence number up to and including the sequence number of the request.

5. The system of claim 1, wherein the one or more computers further include:
a video adapter driver for maintaining a queue of drawing primitives, wherein each entry of the queue comprises a sequence number and a drawing primitive.

6. The system of claim 5, wherein the primary framebuffer is a buffer allocated by a virtual video adapter and the queue is allocated by the video adapter driver that communicates with the virtual video adapter.

7. The system of claim 5, wherein the video adapter driver is a component of a guest operating system of a virtual machine instantiated on the one or more computers.

8. A method comprising:
updating a queue of completed drawing primitives upon execution of drawing primitives into a primary framebuffer;
receiving a request for a list of drawing primitives that corresponds to updated display data in a secondary framebuffer;
providing the requested list of drawing primitives to a display encoder;
determining a first bandwidth usage for transmitting a drawing primitive from the requested list;
determining a second bandwidth usage for transmitting the updated display data corresponding to the drawing primitive from the secondary framebuffer; and
transmitting either the drawing primitive or the updated display data in the secondary framebuffer to a client terminal based on which of the first bandwidth usage and the second bandwidth usage is lesser.

9. The method of claim 8, comprising clearing each entry in the requested list of drawing primitives from the queue.

10. The method of claim 8, wherein the request includes a sequence number corresponding to a last drawing primitive to update display data in the secondary framebuffer.

11. The method of claim 10, wherein each entry in the queue comprises a sequence number and a drawing primitive.

12. The method of claim 11, wherein providing the requested list of drawing primitives comprises extracting the requested list of drawing primitives from the queue, wherein extracting includes identifying each entry in the queue including a sequence number up to and including the sequence number of the request.

13. The method of claim 8, wherein the primary framebuffer is a buffer allocated by a virtual video adapter and the queue is allocated by a video adapter driver that communicates with the virtual video adapter.

14. The method of claim 13, wherein the video adapter driver is a component of a guest operating system of a virtual machine instantiated on the server.

15. The method of claim 8, further comprising the step of initiating an interrupt to the display encoder upon an update of the queue.

16. A non-transitory computer-readable medium including instructions that, when executed by a processing unit of a computer having a primary framebuffer for storing display data and a display encoder that uses a secondary framebuffer for transmitting display data to a remote client terminal, causes the processing unit to performing the steps of:
updating a queue of completed drawing primitives upon execution of drawing primitives into the primary framebuffer;
receiving a request from the display encoder for a list of drawing primitives that corresponds to updated display data in the secondary framebuffer;
providing the requested list of drawing primitives to the display encoder;
determining a first bandwidth usage for transmitting a drawing primitive from the requested list;
determining a second bandwidth usage for transmitting the updated display data corresponding to the drawing primitive from the secondary framebuffer; and
transmitting either the drawing primitive or the updated display data in the secondary framebuffer to the client terminal based on which of the first bandwidth usage and the second bandwidth usage is lesser.

17. The computer-readable medium of claim 16, further including instructions that cause the processing unit to perform operations comprising clearing each entry in the requested list of drawing primitives from the queue.

18. The computer-readable medium of claim 16, wherein the request includes a sequence number corresponding to a last drawing primitive to update display data in the secondary framebuffer.

19. The computer-readable medium of claim 18, wherein each entry in the queue comprises a sequence number and a drawing primitive.

20. The computer-readable medium of claim 19, wherein providing the requested list of drawing primitives comprises extracting the requested list of drawing primitives from the queue, wherein extracting includes identifying each entry in the queue including a sequence number up to and including the sequence number of the request.

* * * * *